C. CHRISTIANSEN.
HAY RAKE AND LOADER.
APPLICATION FILED APR. 10, 1911.
1,029,790.
Patented June 18, 1912.
4 SHEETS—SHEET 1.
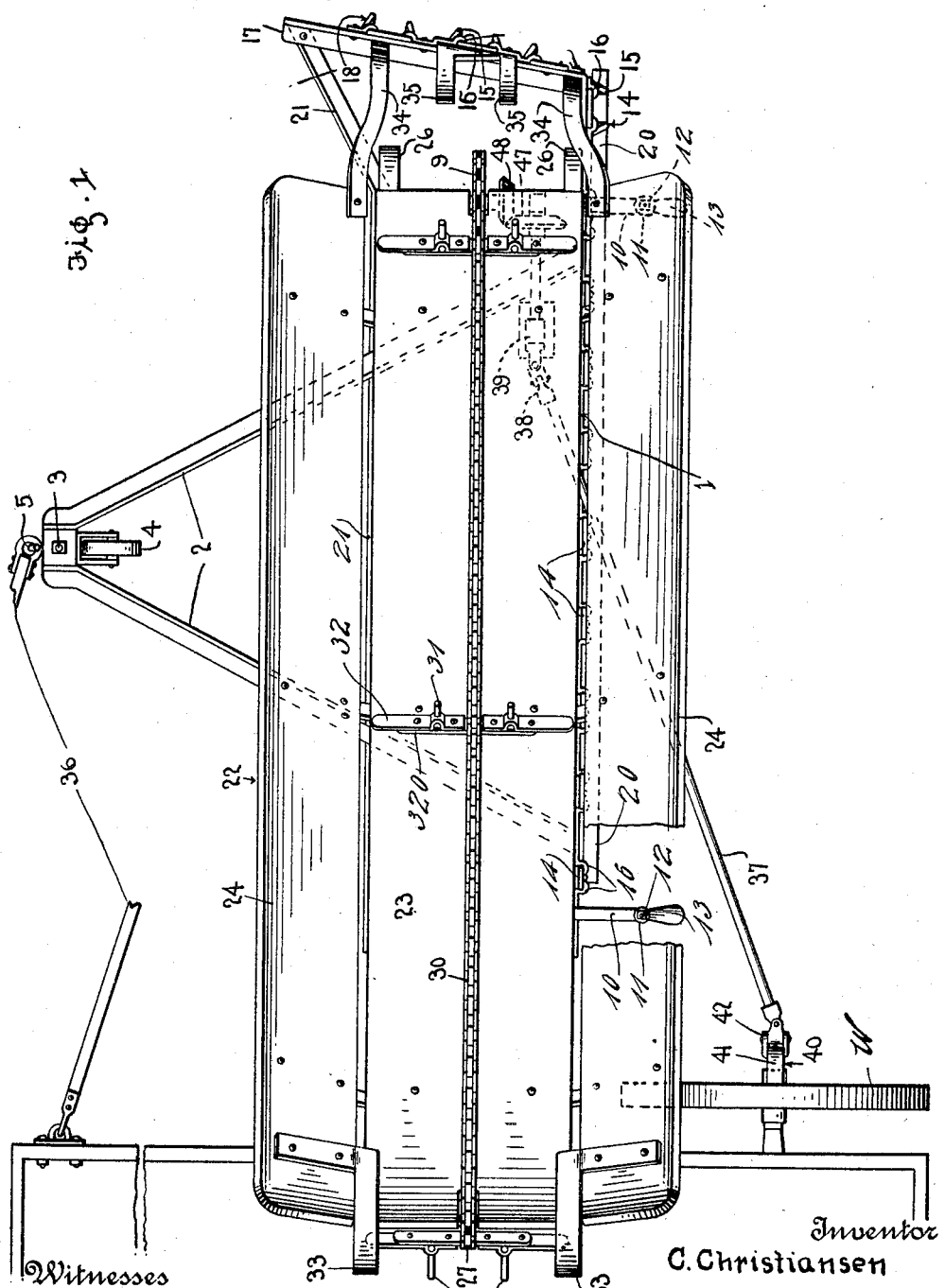

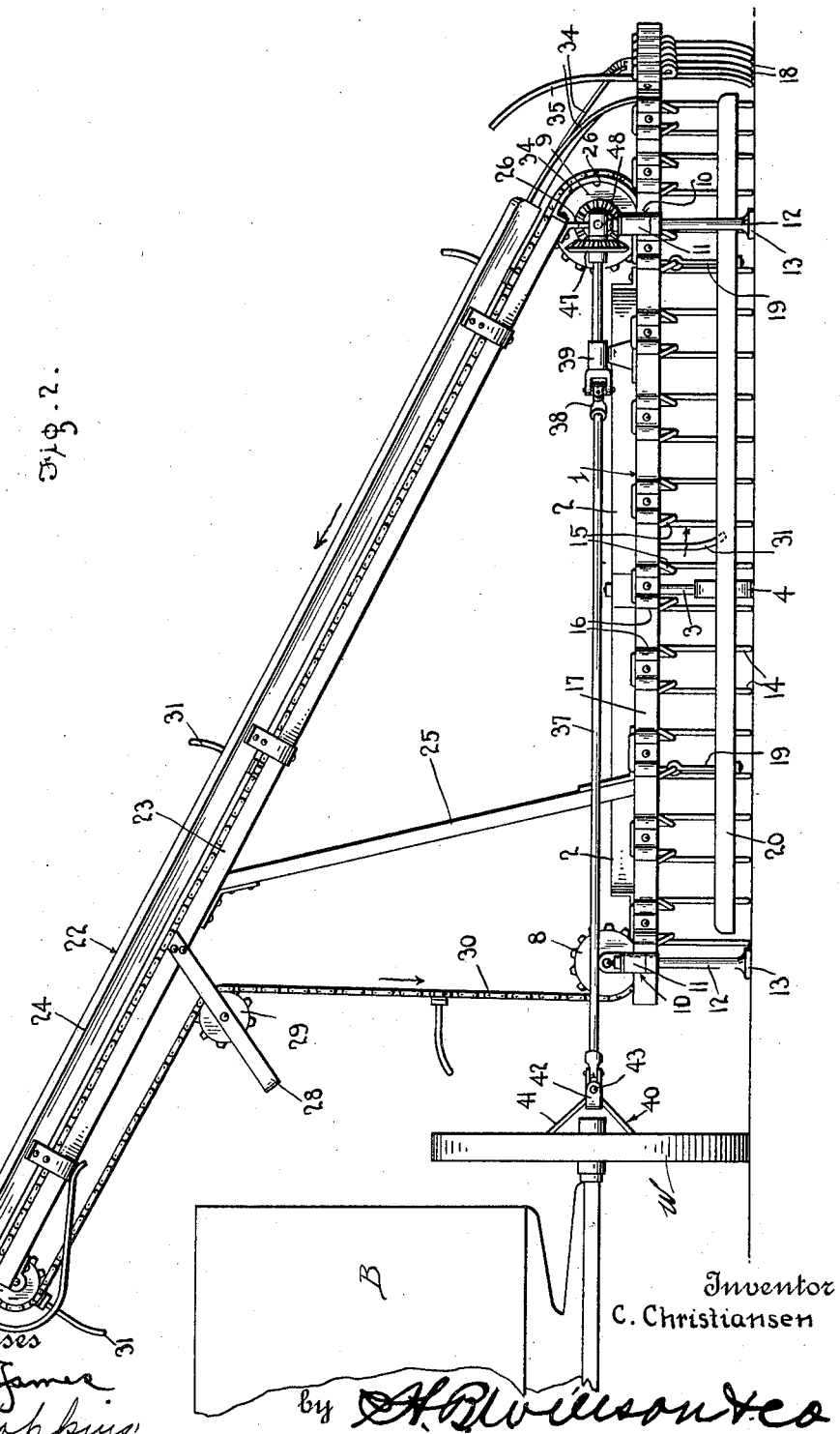

C. CHRISTIANSEN.
HAY RAKE AND LOADER.
APPLICATION FILED APR. 10, 1911.
1,029,790.
Patented June 18, 1912.
4 SHEETS—SHEET 3.
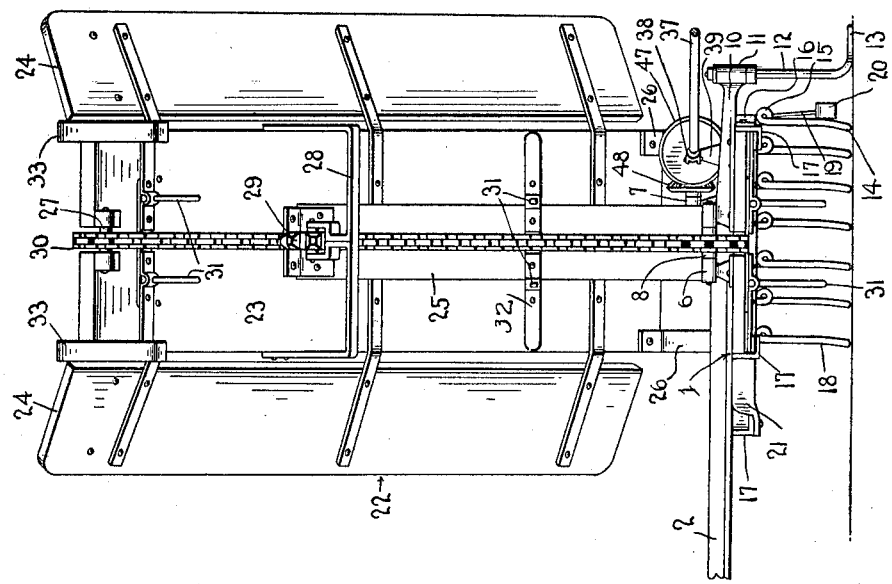
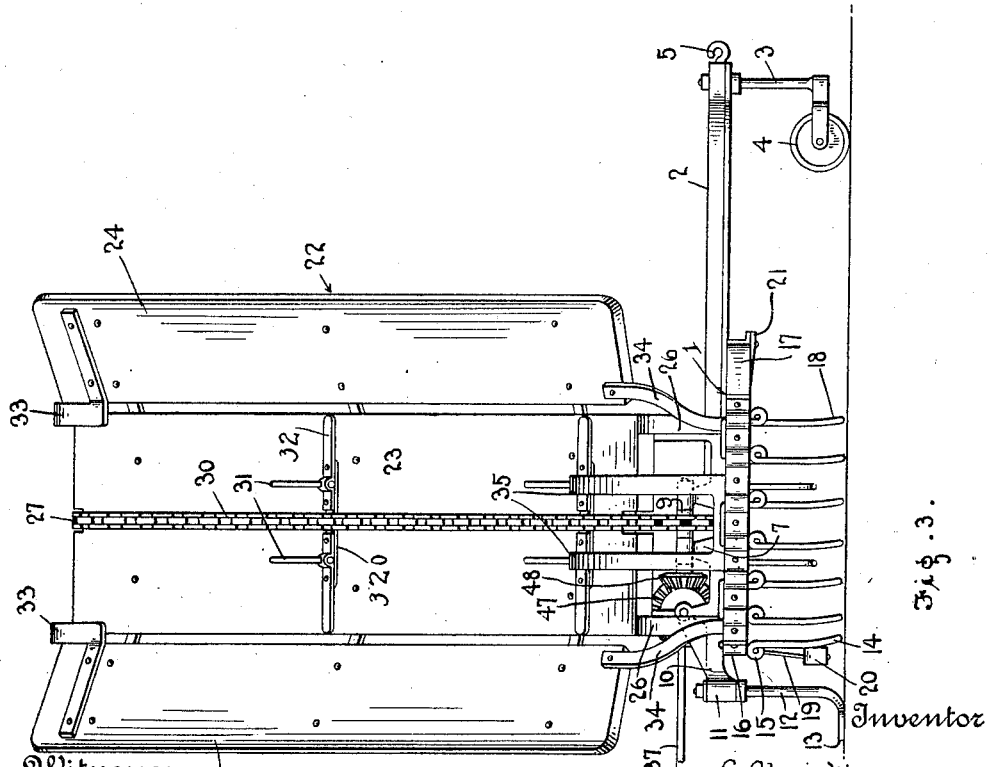

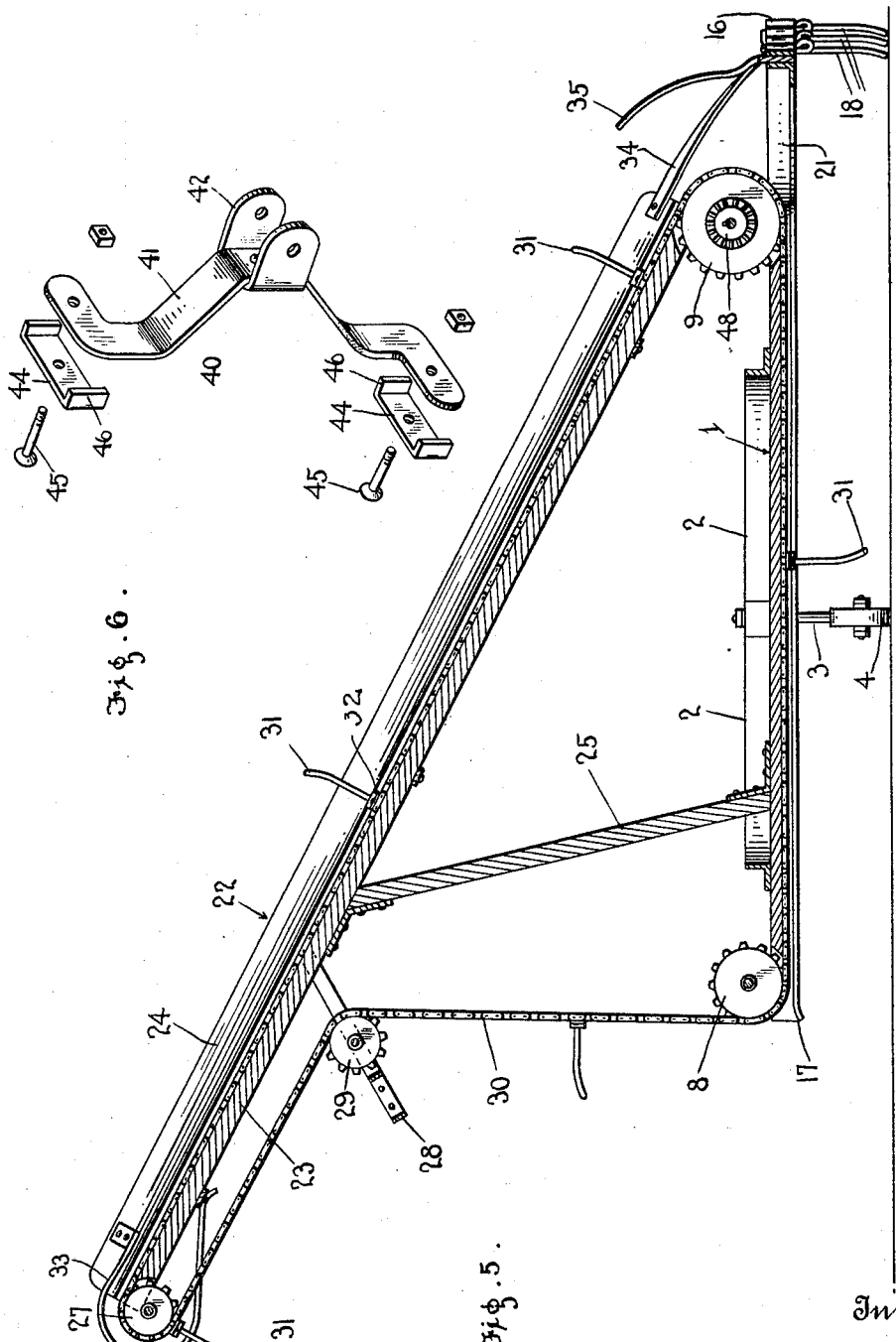

UNITED STATES PATENT OFFICE.

CHRISTIAN CHRISTIANSEN, OF KENMARE, NORTH DAKOTA.

HAY RAKE AND LOADER.

1,029,790.  Specification of Letters Patent.  Patented June 18, 1912.

Application filed April 10, 1911. Serial No. 620,056.

*To all whom it may concern:*

Be it known that I, CHRISTIAN CHRISTIANSEN, a citizen of the United States, residing at Kenmare, in the county of Ward and State of North Dakota, have invented certain new and useful Improvements in Hay Rakes and Loaders; and I do declare the following to be a full, clear, and exact description of the invention, such as will enable others skilled in the art to which it appertains to make and use the same.

This invention relates to improvements in hay rakes and loaders.

One object of the invention is to provide a machine of this character adapted to be connected to and drawn along by the wagon into which the hay is to be loaded and having means whereby the elevating mechanism of the loader is connected to and driven by one of the wheels of the wagon.

Another object is to provide a machine of this character which will be simple, strong and durable in construction, efficient and reliable in operation and well adapted to the purpose for which it is designed.

With these and other objects in view, the invention consists of certain novel features of construction, combination and arrangement of parts as will be more fully described and particularly pointed out in the appended claims.

In the accompanying drawings: Figure 1 is a plan view of my improved hay rake and loader showing the same operatively connected to a wagon; Fig. 2 is a rear view of the same; Fig. 3 is a front or outer end view of the machine; Fig. 4 is an inner or rear end view thereof; Fig. 5 is a vertical longitudinal sectional view; Fig. 6 is a detail perspective view of the wheel clamp.

In the embodiment of the invention I provide a main supporting frame comprising a platform 1 to the upper side of which are secured forwardly projecting converging angle iron draft bars 2 in the outer ends of which is secured the upper end of a caster wheel standard 3 on the lower end of which is arranged a caster wheel 4. To the standard 3 is connected a draft hook or clevis 5. On the opposite ends of the platform 1 are secured bearing brackets 6 and 7 in which are revolubly mounted sprocket gears 8 and 9 with which is engaged and driven the elevating mechanism hereinafter described. The brackets 6 and 7 are provided with rearwardly projecting extensions 10 having on their outer ends vertical bearings 11 with which are pivotally connected the upper ends of runner standards 12 on the lower ends of which are formed flat rearwardly projecting feet or runners 13 whereby the rear portion of the machine is suitably supported when drawn over the ground.

To the rear edge of the platform 1 is secured a series of rake teeth 14 said teeth being preferably formed in pairs from a single spring metal rod bent into substantially U shape. The rods after being bent in U-shape are each preferably bent to form a spring coil 15 and the lower portions of the teeth formed by the ends of the rod are preferably bent or curved forwardly to a slight extent as shown. The upper looped ends of the teeth are secured to the rear edge of the platform preferably by a series of clamping plates 16 which are riveted through the looped ends of the teeth to angle iron metal binding strips 17 secured to the rear edge of the platform as shown.

The outer end of the binding strip 17 is extended and bent forwardly at the outer end of the machine as clearly shown in Fig. 1 of the drawing and to said extending end of the strip are secured additional rake teeth 18 the purpose of which will be hereinafter described. The rake teeth 18 are constructed and secured to the angle iron strip 17 in the same manner as the teeth 14. Arranged in rear of the teeth 14 and loosely supported by means of links 19 which are engaged with the coils 15 of the teeth is a drag bar 20 which is provided to assist the teeth 14 in cleanly raking up the hay. On the front edge of the platform is secured an angle iron binding strip 21 the outer end of which projects beyond the outer end of the machine and is bent forwardly to form a brace with which the forward end of the extension of the strip 17 is connected.

Arranged above and supported in an inclined position on the platform 1 is a hay elevating frame or chute 22 comprising a base or bottom member 23 to which are secured inclined side bars 24, said bars being secured to the base by suitable supporting brackets as shown. The lower outer end of the base or bottom plate 23 is secured and supported by the brackets 7 at the outer end of the platform 1 and its inner higher end by a supporting brace 25. The opposite ends of the base 23 are notched and to the lower end of the base are secured the upper ends of curved guide bars 26 the lower ends of which bear against the adjacent end of the platform 1 as shown. In the brackets 7 at the lower end of the base 23 is revolubly mounted the sprocket gear 9 while in the notched upper end of the base is revolubly mounted a sprocket pinion 27.

Secured to the lower side of the base 23 of the chute is a depending bearing frame or hanger 28 in which is revolubly mounted a sprocket gear 29. Passing around the sprocket gears 8 and 9 of the frame and the gears 27 and 29 on the chute is a sprocket chain 30 whose links at certain intervals carry elevating teeth 31 which when the chain is driven in the proper direction will engage the hay as it is raked up by the rake teeth and will convey the hay up the chute 22 and discharge the same over the upper end of the chute into the wagon body B to which the machine is attached. The teeth 31 are here shown in the form of wire rods having their inner ends bent at right angles to form attaching members and having their outer ends curved slightly and inserted through apertures in clamping plates 32 which are riveted to lateral extensions 320 formed on the opposite sides of certain of the chain links as shown. By providing the sprocket 29 and arranging the same in the bracket or hanger 28 as herein shown and described the chain at the inner end of the machine will be held back to a position where the same will not interfere with the arrangement of the upper end of the chute thus permitting said end to project over the top of the wagon body B and to properly discharge the hay therein.

On the upper end of the chute are arranged spring guards or guide bars 33 over which the hay is drawn by the elevating chain and the hay directed from the end of the chute onto the wagon. On the lower end of the chute and connected to the side bars 24 are guide bars 34. Secured to the extended outer end of the strip 17 to which the rack teeth 18 are attached are upwardly extending guide bars 35 which together with the guide bars 34 hold the hay in engagement with the elevating teeth on the chain while being brought around the forward lower end of the elevator or chute.

The machine is connected to the wagon at its forward end by a suitable draft rod 36 which is connected to the clevis 5 on the standard of the caster wheel 4, said draft rod having its opposite end connected to the wagon B in any suitable manner. The machine is also connected to the adjacent rear wheel W of the wagon by a combined attaching and operating shaft 37 which is preferably formed in two or more sections, said sections being connected together by universal joints 38, whereby said shaft is made flexible. The outer section of the shaft 37 is revolubly mounted near its inner end in a bearing bracket 39 and at its outer end in the bracket 7 of the outer sprocket wheel 9. Pivotally connected to the inner end of the inner section of the shaft is a wheel clamp 40 comprising a body bar 41 on which mid-way between its ends are formed pivot lugs 42 through which and through the end of the shaft is passed a pivot pin or bolt 43. The opposite ends of the bar 41 are adapted to engage the outer sides of two spokes while with the opposite sides of the spokes are engaged clip plates 44 through which and through the ends of the bar 41 are inserted bolts 45 which when screwed up will draw the plates 44 and ends of the bar 41 into rigid engagement with two spokes on opposite sides of the hub as shown. The ends of the plates 44 are preferably bent inwardly to a slight extent to form right angular feet 46 which engage the sides of the spokes and prevent the plates and the clamped ends of the bar 41 from slipping laterally on the spokes. By thus connecting the inner end of the shaft 37 to the wheel the shaft will be driven by the movement of the wheel. The movement of the shaft when thus driven is imparted to the elevating chain by a bevel gear 47 which is in operative engagement with a bevel pinion 48 fixedly mounted on the adjacent end of the shaft of the sprocket gear 9 whereby the latter is driven and the sprocket chain thus operated in the proper direction for elevating the hay in the manner described.

With the above construction of this machine, the operation is as follows: As the wagon B progresses along the field, the draft rod 36 draws the platform and rakes along a line parallel with the course of the wagon, which will be toward the top of the sheet bearing Fig. 1. Meanwhile the wheel W through the wheel clamp shown in Fig. 6 rotates the shaft 37 which through the bevel gears 47 and 48 drives the elevator. The rake teeth 14 and 18 gather the hay from the surface as the rakes move over it, and the elevator teeth or fingers 31 (following the course shown by the arrows in Fig. 2) carry the hay along outward beneath the platform and around under its outer end over the guide bars 24 and under the guide bars 34 and 35, and thence carry it upward over the elevator and deliver it into the wagon body B. Meanwhile the universal joints in the shaft which connects the wheel W with the elevator are useful for permitting the entire platform to rise and fall and to move irregularly as it will of necessity do while traveling over the field, and the shaft and the wheel clamp serve the further function of holding the platform out from the wagon while it is drawn forward by the draft rod 36. The drag bar 20, hung on links 19 from the coils 15 of the teeth 14, I find to be extremely useful in normally preventing hay from passing between the teeth while yet permitting the passage of a stone or other obstruction. The outer teeth 18 I find useful for preventing the fingers 31 from moving the hay collected by them off the outer end of the series of teeth 14, rather than carrying it up over onto the elevator as is desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A combined hay rake and loader comprising a platform having suitable supports, rake teeth depending from the rear edge and outer end of said platform, a chute leading upward and inward from the outer end of said platform, and an elevator including a chain moving around the chute and platform and fingers carried thereby; combined with a wagon, draft mechanism connecting it with said platform, and a flexible shaft connecting one of the wagon wheels with one of the wheels of the elevator mechanism.

2. A combined hay rake and loader comprising a platform having suitable supports, rake teeth depending from the rear edge and outer end of said platform, a chute leading upward and inward from the outer end of said platform, and an elevator including a chain moving around the chute and platform and fingers carried thereby; combined with a wagon, a draft rod connecting its body with the forward portion of said platform, a wheel clamp engaging one of the rear wheels of the wagon, and a shaft including universal joints within its length connecting said clamp with one of the wheels of said eelvator.

3. A combined hay rake and loader comprising a platform having suitable supports, rake teeth depending from the rear edge of said platform, a chute leading upward and inward from the outer end of said platform, and an elevator including a chain moving around the chute and platform and fingers carried thereby; of a wagon, draft mechanism connecting it with said platform, a flexible shaft connecting one of the wagon wheels with one of the wheels of said elevator, and guide bars at the outer end of said platform, for directing the hay to the lower end of the chute during the movement of said fingers around the outer shaft of the elevator.

4. In a combined hay rake and loader, the combination with a platform mounted on suitable supports, connections between it and a wagon, an elevator having its inlet end disposed at the outer end of said platform, and means for driving the elevator; of clamping plates secured along the rear edge and outer end of said platform, rake teeth of inverted U-shape whose centers are engaged by said plates and whose arms are formed into coils, a drag bar extending across in rear of the series of rearmost teeth, and links loosely supporting said drag bar from certain of said coils.

In testimony whereof I have hereunto set my hand in presence of two subscribing witnesses.

CHRISTIAN CHRISTIANSEN.

Witnesses:
 GEO. M. GRAY,
 LOUIS FREDRICKSEN.

Copies of this patent may be obtained for five cents each, by addressing the "Commissioner of Patents, Washington, D. C."